United States Patent
Shin et al.

(10) Patent No.: US 7,061,670 B2
(45) Date of Patent: Jun. 13, 2006

(54) OPTICAL FIBER AMPLIFIER HAVING AUTOMATIC POWER CONTROL FUNCTION AND AUTOMATIC POWER CONTROL METHOD

(75) Inventors: Hong-Seok Shin, Suwon-shi (KR); Seong-Taek Hwang, Pyongtaek-shi (KR); Byung-Chang Kang, Yongin-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 325 days.

(21) Appl. No.: 10/458,438

(22) Filed: Jun. 10, 2003

(65) Prior Publication Data

US 2004/0109227 A1 Jun. 10, 2004

(30) Foreign Application Priority Data

Dec. 7, 2002 (KR) ...................... 10-2002-0077600

(51) Int. Cl.
*H04B 10/12* (2006.01)
(52) U.S. Cl. ................................ 359/341.42
(58) Field of Classification Search ............ 359/341.42
See application file for complete search history.

(56) References Cited

U.S. PATENT DOCUMENTS

| | | | | |
|---|---|---|---|---|
| 5,706,126 A | * | 1/1998 | Fujita ..................... | 359/341.42 |
| 5,818,629 A | * | 10/1998 | Kinoshita ............... | 359/337.11 |
| 5,859,725 A | * | 1/1999 | Sugiya et al. .......... | 359/337.13 |
| 5,963,361 A | * | 10/1999 | Taylor et al. ............... | 359/337 |
| 6,038,061 A | * | 3/2000 | Sugaya ....................... | 359/337 |
| 6,055,092 A | * | 4/2000 | Sugaya et al. ............... | 359/337 |
| 6,317,254 B1 | * | 11/2001 | Park et al. ............. | 359/337.13 |
| 6,369,938 B1 | * | 4/2002 | Sugaya et al. ......... | 359/341.42 |
| 6,400,499 B1 | * | 6/2002 | Sugaya et al. ......... | 359/341.42 |
| 6,480,329 B1 | * | 11/2002 | Sugaya et al. ......... | 359/341.42 |
| 2001/0017729 A1 | * | 8/2001 | Sugaya et al. ......... | 359/341.41 |
| 2002/0075562 A1 | | 6/2002 | Youn et al. | |
| 2002/0093726 A1 | * | 7/2002 | Sugaya et al. .............. | 359/337 |
| 2003/0161034 A1 | * | 8/2003 | Nikaidou ............... | 359/341.41 |
| 2004/0240042 A1 | * | 12/2004 | Charlet et al. ............. | 359/337 |

FOREIGN PATENT DOCUMENTS

| EP | 0973276 A2 | 1/2000 |
|---|---|---|
| EP | 1033834 A2 | 9/2000 |
| EP | 1137129 A2 | 9/2000 |

* cited by examiner

*Primary Examiner*—Jack Keith
*Assistant Examiner*—Eric Bolda
(74) *Attorney, Agent, or Firm*—Cha & Reiter, L.L.C.

(57) ABSTRACT

An optical fiber amplifier features an optical amplifying section for amplifying an inputted optical signal. A sampling section is provided for shunting part of the optical signal amplified by the optical amplifying section and detecting a first test light belonging to a short wavelength band and a second test light belonging to a long wavelength band. An input power control circuit serves to compare respective powers of the first and second test lights and then outputs a control signal for controlling an input power of the optical signal inputted to the optical amplifying section according to the power differential of the first and second test lights. An output power control circuit derives an output power of the optical amplifying section from the power of the optical signal shunted at the sampling section and also controls the optical amplifying section so that the output power of the optical amplifying section attains a predetermined value. A variable attenuator controls the power of the optical signal inputted to the optical amplifying section according to the control signal.

13 Claims, 7 Drawing Sheets

OPTICAL FIBER AMPLIFIER HAVING AUTOMATIC POWER CONTROL FUNCTION AND AUTOMATIC POWER CONTROL METHOD

CLAIM OF PRIORITY

This application claims priority to an application entitled "Optical Fiber Amplifier Having Automatic Power Control Function and Automatic Power Control Method," filed in the Korean Intellectual Property Office on Dec. 7, 2002 and assigned Ser. No. 2002-77600, the contents of which are hereby incorporated by reference.

BACKGROUND OF THE INVENTION

1. Field of the Invention

The present invention relates to an optical communication network, and more particularly to an optical fiber amplifier disposed on an optical transmission line.

2. Description of the Related Art

Technical developments in optical fiber amplifiers have accelerated the spread of wavelength division multiplexing transmission systems and networks, because optical fiber amplifiers can increase signal transmitting distance and uniformly compensate for a loss generated in an optical device over a relatively wide range of wavelengths. In wavelength division multiplexing, an optical signal is composed of a plurality of channels having different wavelengths. Conventional wavelength division multiplexing optical fiber amplifiers can be divided into those with automatic gain control (AGC) which maintain in each channel a gain that is held constant against input power variation, and those with automatic power control (APC) which can maintain a constant output power, regardless of the input power or channel. Transmission of signals tends to vary power level by channel. In compensation, gain is varied by channel in a phenomenon known as gain tilt, which remains constant over input power levels for AGC optical fiber amplifiers. A gain tilt-minimized state refers to again flattened state, in which gain is relatively invariant with channel. The higher the gain tilt, the bigger the power difference between channels. Problematically, known APC optical fiber amplifiers cannot maintain a constant gain tilt.

FIG. 1 shows the configuration of an optical fiber amplifier with automatic gain control in the prior art. The optical fiber amplifier comprises first and second tap couplers (TAB) 110, 130, first and second optical detectors 140, 150, an optical amplifying section 120 and a gain control circuit (CTRL) 160.

The first tap coupler 110 has first to third ports. Part of an optical signal inputted to the first port is outputted to the second port. The remaining part of the optical signal is outputted to the third port.

The first optical detector 140 converts an optical signal inputted through the third port of the first tap coupler 110 into an electric signal and outputs the converted signal. Photodiodes (PD) can be used as the first and second optical detectors 140, 150.

The optical amplifying section 120 amplifies and outputs an inputted optical signal. The optical amplifying section 120 may comprise an erbium doped fiber amplifier (EDFA) having an erbium doped fiber (EDF), a pumping light source for pumping the erbium doped optical fiber and a wavelength division multiplexing coupler (WDM coupler) for coupling pumping light outputted from the pumping light source to the erbium doped optical fiber.

The second tap coupler 130 has first to third ports. Part of an optical signal inputted to the first port is outputted to the second port. The remaining part of the optical signal is outputted to the third port.

The second optical detector 150 converts an optical signal inputted through the third port of the second tap coupler into an electric signal and outputs the converted signal.

The gain control circuit 160 compares the powers of electric signals inputted from the first and second optical detectors with each other. Also, the gain control circuit 160 controls the optical amplifying section 120 so that the gains of the channels of the optical signal can be constantly maintained.

FIG. 2 shows power variations in an optical signal on an optical transmission line where a plurality of optical fiber amplifiers are disposed. The optical transmission line includes a plurality of sections which are divided according to the positions (D1, D2, D3, D4) of optical fiber amplifiers. While being sent along the optical transmission line, an optical signal is amplified by each optical fiber amplifier. The power of the optical signal is gradually attenuated until the signal meets a next optical fiber amplifier. In the optical fiber amplifiers, the gains of channels, for example, (P1–P3) or (P2–P4), is constantly maintained. As a result, a transmission loss generated on the optical transmission line is uniformly compensated. An optical signal that has been amplified by an optical fiber amplifier gradually loses power as it propagates along the optical transmission line. The optical signal can be restored to its original power after passing through each optical fiber amplifier having a gain which is set to be identical to the loss of the optical transmission line. However, the capacity of general optical fibers which are used for optical transmission lines gradually degrades over time due to deterioration of the fibers. Capacity can also suffer due to temporary problems on the optical transmission line. Factors such as these can lead to an increase of transmission loss of any of the sections affected. If optical fiber amplifiers having a constant gain are used on an optical transmission line having the properties mentioned above, an optical signal inputted to each optical fiber amplifier will experience gradual power loss and, at the final receiving end, power which has been greatly reduced as compared to the original power. Low power signals are therefore subject to frequent error.

FIG. 3 shows the configuration of an optical fiber amplifier with automatic power control in the prior art. The optical fiber amplifier comprises an optical amplifying section 210, a tap coupler 220, an optical detector 230 and an output power control circuit 240.

In FIG. 3, the optical amplifying section 210 amplifies and outputs an inputted optical signal. The optical amplifying section 210 may comprise an erbium added optical fiber amplifier having an erbium doped optical fiber, a pumping light source for pumping the erbium doped optical fiber and a wavelength division multiplexing coupler for coupling a pumping light outputted from the pumping light source to the erbium doped optical fiber.

The tap coupler 220 has first to third ports. Part of an optical signal inputted to the first port is outputted to the second port. The remaining part of the signal is outputted to the third port.

The optical detector 230 converts an optical signal inputted through the third port of the tap coupler 220 into an electric signal and outputs the converted signal.

The output power control circuit 240 controls the optical amplifying section 210 according to the power of an electric signal inputted from the optical detector 230 so that the output power of the optical amplifying section 210 is urged to a desired value.

FIG. 4 shows power variations in an optical signal on an optical transmission line where a plurality of optical fiber amplifiers are disposed. The optical transmission line includes a plurality of sections which are divided according to the positions (D1, D2, D3, D4) of optical fiber amplifiers. While being sent along the optical transmission line, an optical signal is amplified by each optical fiber amplifier each having a constant output power of P5. The power of the optical signal is gradually attenuated until the signal meets the next optical fiber amplifier. For example, an optical signal has a power of P6 when inputted to an optical fiber amplifier disposed at position D5. When the optical signal is inputted in an optical fiber amplifier at position D8, it has a power of P7 (lower than P6). Since the output power of the optical fiber amplifiers is fixed, an optical signal will have a constant output power of P5 immediately after amplification by each optical fiber amplifier, even if the transmission loss at each section is variable due to deterioration of the optical transmission line. Use of optical fiber amplifiers to produce constant output power, irrespective of the power of an inputted optical signal, avoids deterioration, gradually over time and cumulatively over distance, in the capacity of the optical transmission line. It is also possible to prevent sudden decrease in the capacity of an optical communication network caused by an increase of transmission loss in a certain section. However, the above optical fiber amplifiers are not widely applicable because they cannot maintain a constant gain tilt, which is one of the requirements for a wavelength division multiplexing optical fiber amplifier. Variations in a gain tilt are made when the power of an inputted optical signal is changed during automatic output power control by the optical fiber amplifiers.

SUMMARY OF THE INVENTION

The present invention solves the above-mentioned problems occurring in the prior art, and is directed to providing an optical fiber amplifier with automatic power control which can maintain a constant gain tilt. The inventive amplifier minimizes the difference among channels as to signal quality, which is caused by long-distance transmission or cumulative difference between the powers of channels in networks including ADMs (add/drop multiplexers).

The optical fiber amplifier features an optical amplifying section for amplifying an inputted optical signal. A sampling section is provided for shunting part of the optical signal amplified by the optical amplifying section and detecting a first test light belonging to a short wavelength band adjacent to a signal wavelength band from the shunted optical signal and a second test light belonging to a long wavelength band adjacent to the signal wavelength band from the shunted optical signal. An input power control circuit serves to compare the respective powers of the first and second test lights. The input power control circuit then serves to output a control signal for controlling an input power of the optical signal inputted to the optical amplifying section according to the power differential. The optical fiber amplifier further includes an output power control circuit for deriving an output power of the optical amplifying section from the power of the optical signal shunted at the sampling section and controlling the optical amplifying section so that the output power of the optical amplifying section attains a desired value. Further featured is a variable attenuator for controlling the power of the optical signal inputted to the optical amplifying section according to the control signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings.

Figure 1:
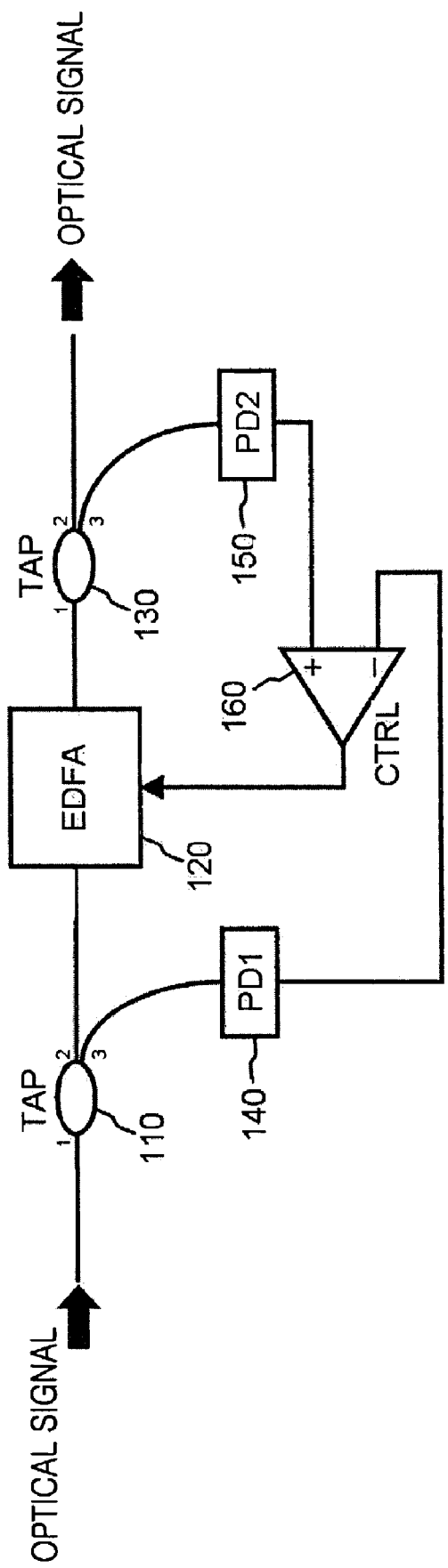
FIG. 1 shows the configuration of an optical fiber amplifier with automatic gain control in the prior art.
Figure 2:
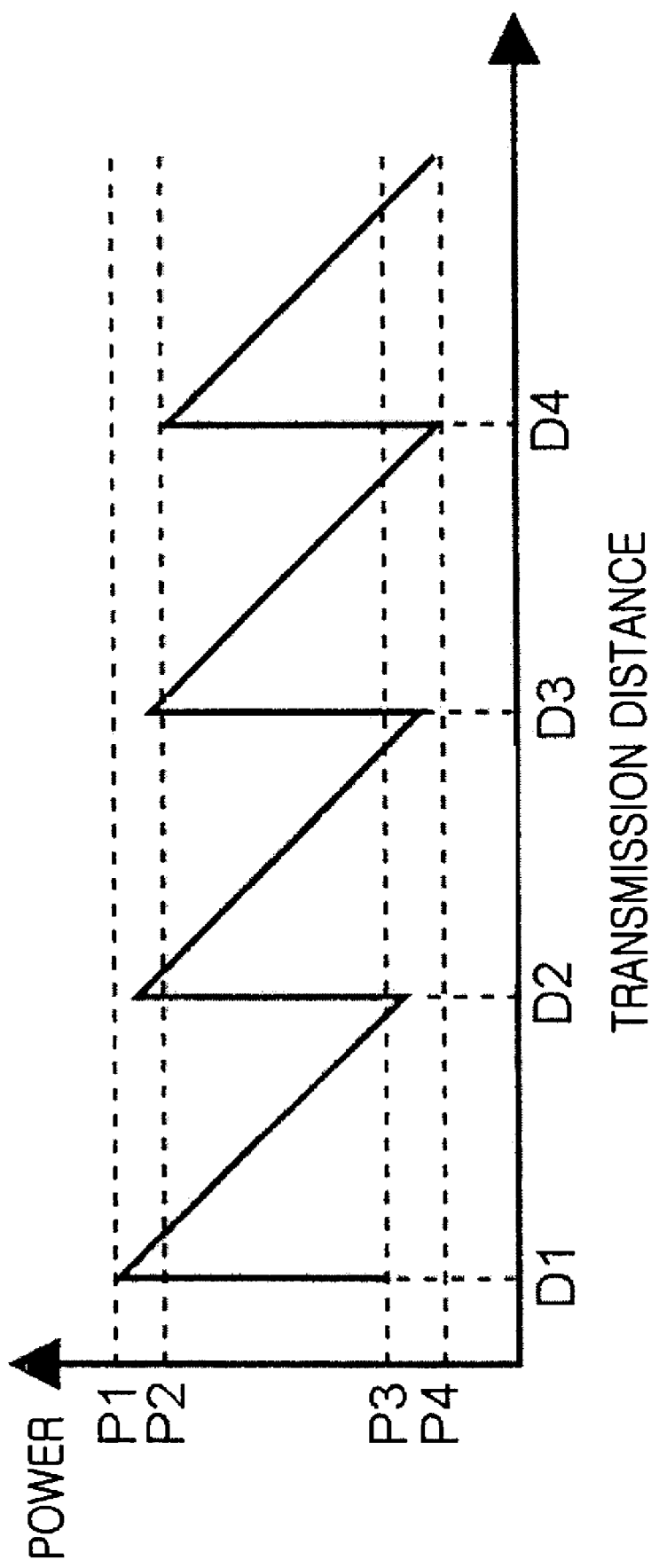
FIG. 2 shows power variations in an optical signal on an optical transmission line where a plurality of optical fiber amplifiers such as those in FIG. 1 are disposed.
Figure 3:
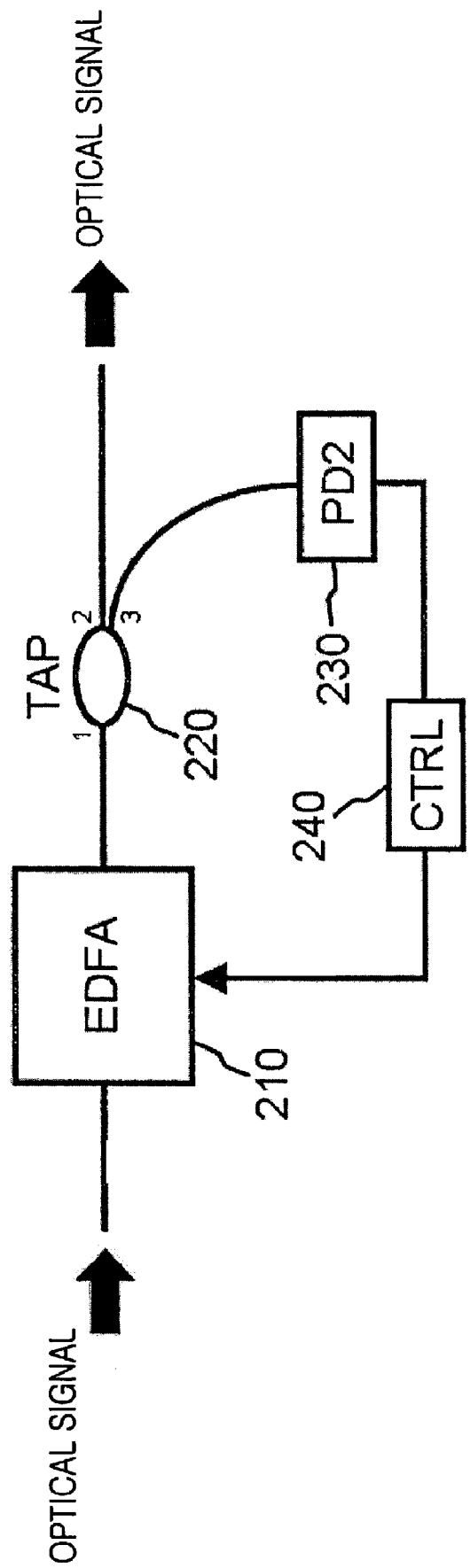
FIG. 3 shows the configuration of an optical fiber amplifier with automatic power control in the prior art.
Figure 4:
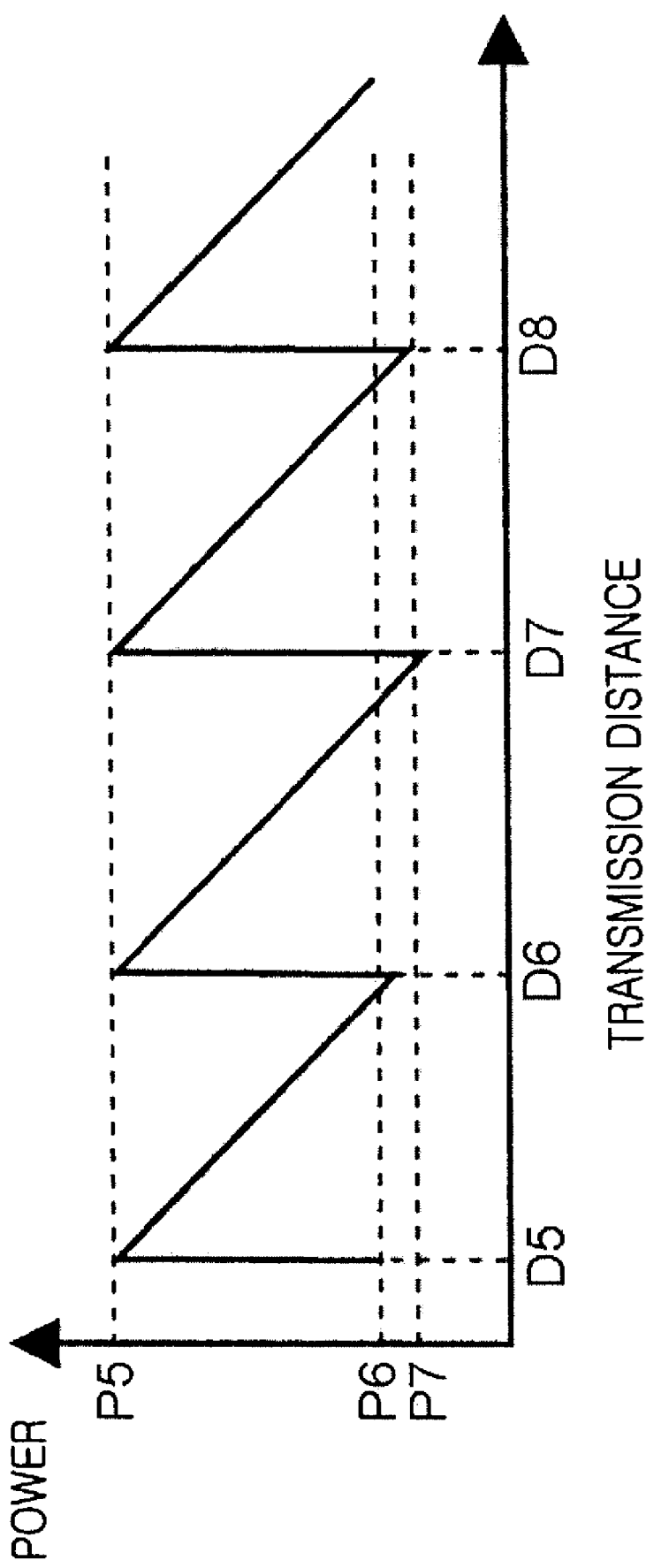
FIG. 4 shows power variations in an optical signal on an optical transmission line where a plurality of optical fiber amplifiers such as those in FIG. 3 are disposed.
Figure 5:
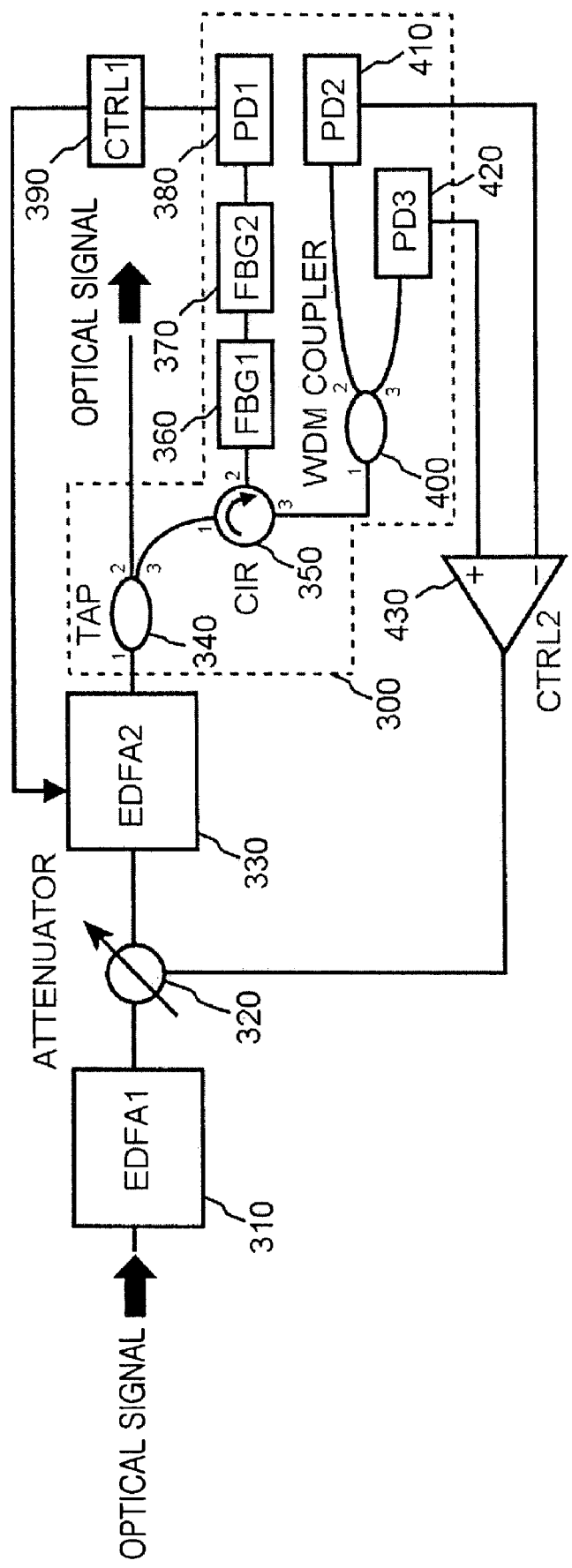
FIG. 5 shows the configuration of an optical fiber amplifier having an automatic power control function according to a preferred embodiment of the present invention.
Figure 6:
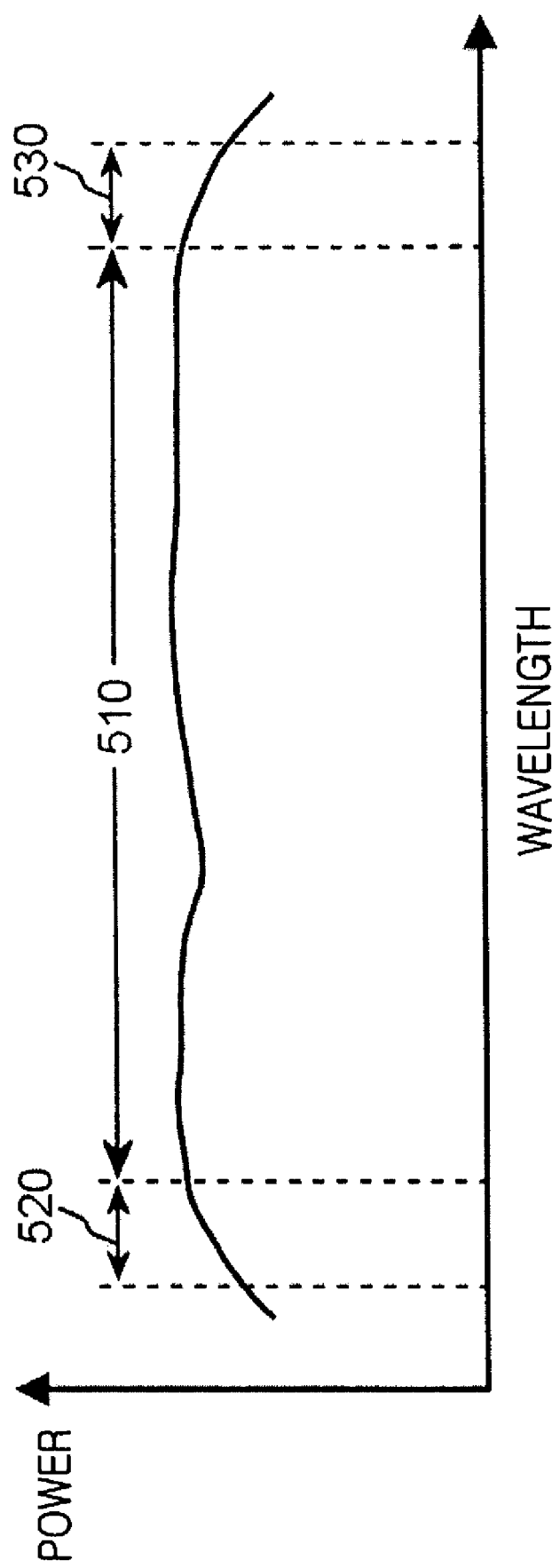
FIG. 6 shows the operation of the optical fiber amplifier of FIG. 5.

FIG. 5 shows the configuration of an optical fiber amplifier having an automatic power control function according to the present invention. FIG. 6 shows the operation of the optical fiber amplifier of FIG. 5. Referring first to FIG. 5, the optical fiber amplifier comprises first and second optical amplifying sections 310, 330, a variable attenuator 320, a sampling section 300, an input power control circuit 430 and an output power control circuit 390.

The first optical amplifying section 310 amplifies and outputs an inputted optical signal. The first optical amplifying section 310 may include an erbium doped fiber (EDF), a pumping light source for pumping the erbium doped optical fiber and a wavelength division multiplexing coupler for coupling a pumping light outputted from the pumping light source to the erbium doped optical fiber.

The variable attenuator 320 controls the level of optical attenuation according to a control signal, thereby controlling the power of an optical signal inputted to the second optical amplifying section 330.

The second optical amplifying section 330 amplifies and outputs the optical signal inputted from the variable attenuator 320. The second optical amplifying section 320 may include an erbium doped fiber (EDF), a pumping light source for pumping the erbium doped optical fiber and a wavelength division multiplexing coupler for coupling a pumping light outputted from the pumping light source to the erbium doped optical fiber.

The sampling section 300 shunts part of the optical signal amplified by the second optical amplifying section 330 and detects a first test light belonging to a short wavelength band 520 adjacent to a signal wavelength band 510 from the shunted optical signal and a second test light belonging to a long wavelength band 530 adjacent to the signal wavelength band 510 from the shunted optical signal. The sampling section 300 includes a tap coupler 340, a circulator (CIR) 350, first and second reflective gratings 360, 370, first to third optical detectors 380, 410, 420 and a wavelength division multiplexing coupler 400.

The tap coupler 340 comprises first to third ports. Part of an optical signal inputted through the first port from the second optical amplifying section 330 is outputted through the third port. The remaining part of the optical signal is outputted through the second port.

The circulator 350 comprises first to third ports. An optical signal inputted through the first port from the tap coupler 340 is outputted through the second port. An optical signal inputted through the second port is outputted through the third port.

The first reflective grating 360 reflects the first test light having a predetermined wavelength in an optical signal inputted from the circulator 350. Fiber Bragg gratings (FBG) can be used as the first and second reflective gratings 360, As shown in FIG 6, the first test light belongs to the short wavelength band 520 adjacent to the signal wavelength band 510. Further, the second reflective grating 370 reflects the second test light that has a predetermined wavelength in an optical signal inputted from the first reflective grating 360. As shown in FIG. 6, the second test light belongs to the long wavelength band 530 adjacent to the signal wavelength band 510. The first and second test lights reflected by the first and second reflective gratings 360, 370 are re-transmitted to the circulator 350. The first and second test lights each comprise an amplified spontaneous emission (ASE) outputted from the second optical amplifying section 330. The ASE represents the gain tilt information of the second optical amplifying section 330. When the power of the ASE at a short wavelength is greater than the power at a long wavelength, the power of the optical signal is greater than a desired value. When the power of the ASE at a long wavelength, is lower than the power at a short wavelength, the power of the optical signal is lower than the desired value.

The first optical detector 380 converts an optical signal inputted from the second reflective grating 370 into an electric signal and outputs the converted signal. Photodiodes can be used as the first to third optical detectors 380, 410, 420.

The output power control circuit 390 derives an output power of the second optical amplifying section 330 from the electric signal inputted from the first optical detector 380, and controls the second optical amplifying section 330 so that the output power of the second optical amplifying section 330 is urged to a desired value.

The wavelength division multiplexing coupler 400 comprises first to third ports. The first test light inputted through the first port from the circulator 350 is outputted through the second port. The second test light inputted through the first port from the circulator 350 is outputted through the third port.

The second optical detector 410, which is connected to the second port of the wavelength division multiplexing coupler 400, converts the inputted first test light into an electric signal and outputs the signal.

The third optical detector 420, which is connected to the third port of the wavelength division multiplexing coupler 400, converts the inputted second test light into an electric signal and outputs the signal.

The input power control circuit 430 compares the powers of the electric signals inputted from the second and third optical detectors 410, 420 with each other, and outputs a control signal for controlling the input power of an optical signal inputted to the second optical amplifying section 330 according to the power differential. The control signal is provided to the variable attenuator 320 in order to minimize the gain tilt of the second optical amplifying section 330. The variable attenuator 320 controls the level of optical attenuation according to the control signal. When the power of the optical signal is greater than a desired value, the power of the first test light, belonging to the short wavelength band 520 is greater than. The power of the second test light. When the power of the optical signal is lower than the desired value, the power of the second test light, belonging to the long wavelength band 530 is greater than the power of the first test light. Accordingly, when the power of the first test light is greater than that of the second test light, the level of optical attenuation of the variable attenuator 320 is raised. When the power of the second test light is greater than that of the first test light, the level of optical attenuation of the variable attenuator 320 is lowered to minimize the gain tilt of the second optical amplifying section 330.

Figure 7:
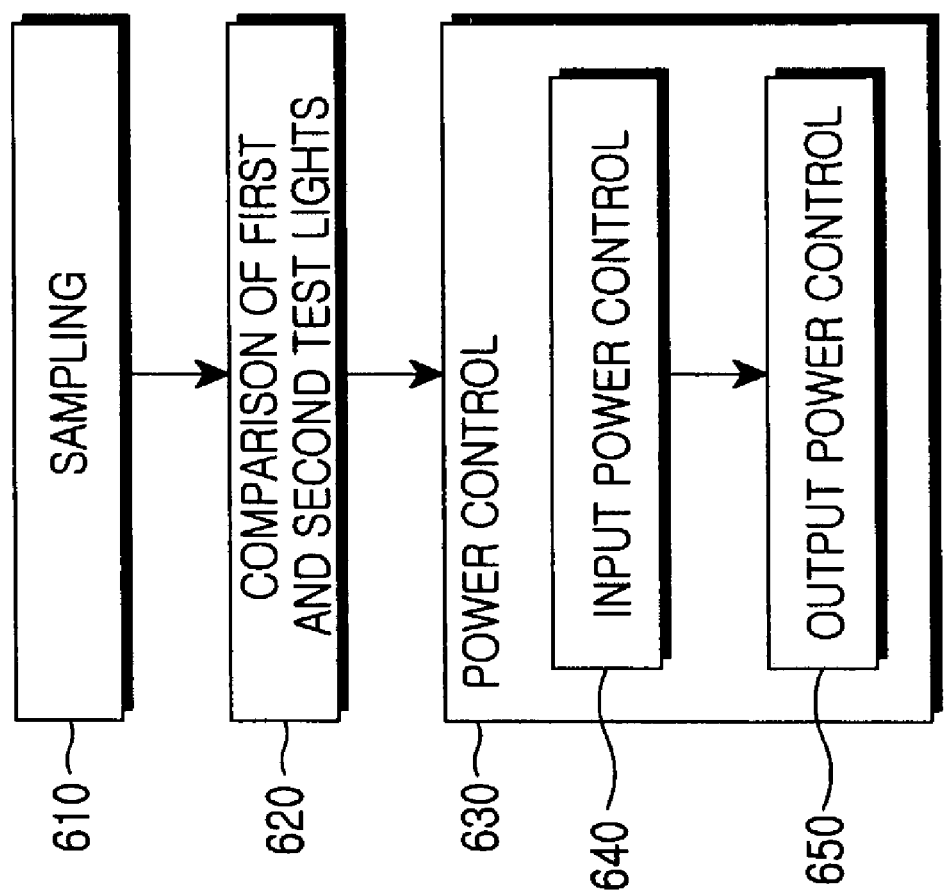
FIG. 7 is a flow chart showing an automatic power control process of the optical fiber amplifier of FIG. 6.

FIG. 7 is a flow chart showing an automatic power control process of the optical fiber amplifier of FIG. 5. The automatic power control process comprises a sampling step 610, a comparing step 620 and a power controlling step 630.

The sampling step 610 shunts part of an optical signal amplified by the second optical amplifying section 330 and detects the first test light, belonging to the short wavelength band 520 adjacent to the signal wavelength band 510, from the shunted optical signal and the second test light, belonging to the long wavelength band 530 adjacent to the signal wavelength band 510, from the shunted optical signal.

The comparing step 620 compares the powers of the first and second test lights with each other and detects the power differential.

The power controlling step 630 comprises an input power controlling sub-step for controlling an input power of an optical signal inputted to the second optical amplifying section 330. The optical signal is inputted according to the power differential obtained at the comparing step 620. The power controlling step 630 further includes an output power controlling sub-step for deriving an output power of the second optical amplifying section 330 from the power of part of the optical signal detected at the sampling step 610 and for controlling the second optical amplifying section 330 so that the output power of the second optical amplifying section 330 is urged to a desired value. At the input power controlling step 640, the input power of the optical signal is reduced when the power of the first test light is greater than that of the second test light. On the other hand, the input power of the optical signal is increased when the power of the second test light is greater than that of the first test light.

As described above, the present invention provides an optical fiber amplifier having an automatic power control function and an automatic power control method, which can monitor and control the gain tilt of an amplified optical signal. Even when an optical signal with nonuniform power is inputted from the outside, the present invention can automatically flatten the gain of each channel of the optical signal, without any channel information, and maintain constant output power.

In addition, the optical fiber amplifier with automatic power control and the automatic power control method according to the present invention can be used in long-distance optical transmission networks, which use optical fibers with great loss by sections for a transmission line, or in ADM networks including ADM (add/drop multiplexer), thereby reducing the transmission differential between channels.

While the invention has been shown and described with reference to a certain preferred embodiment thereof, it will be understood by those skilled in the art that various changes in form and details may be made therein without departing from the spirit and scope of the invention as defined by the appended claims and the equivalents thereof.

What is claimed is:

1. An optical fiber amplifier comprising:
   an optical amplifying section for amplifying an inputted optical signal;
   a sampling section including:
   a tap coupler configured for shunting and outputting part of an optical signal inputted from said sampling section to form said optical signal;
   a circulator which comprises first to third ports, the first port configured for inputting the shunted optical signal, the second port configured for outputting the shunted optical signal, the third port configured for outputting first and second test lights inputted from the second port;
   first and second reflective gratings configured for obtaining the first test light and the second test light from said shunted optical signal;
   optical detectors configured for detecting a first test light belonging to a short wavelength band adjacent to a signal wavelength band from the shunted optical signal and a second test light belonging to a long wavelength band adjacent to the signal wavelength band from the shunted optical signal;
   a wavelength division multiplexing coupler configured for separating the first and second test lights from each other;
   an input power control circuit configured for comparing powers of the first and second test lights with each other and outputting a control signal for controlling an input power of the optical signal inputted to said optical amplifying section according to the power differential of the first and second test lights;
   an output power control circuit for configured deriving an output power of said optical amplifying section from the power of the optical signal shunted at the sampling section and controlling the optical amplifying section so that the output power of the optical amplifying section is controlled to a desired value; and
   a variable attenuator configured for controlling the power of the optical signal inputted to the optical amplifying section according to the control signal.

2. The optical fiber amplifier according to claim 1, further comprising an auxiliary optical amplifying section configured for amplifying an inputted optical signal and outputting the signal to said variable attenuator.

3. The optical fiber amplifier according to claim 1, wherein said optical detectors comprise:
   a first optical detector configured for converting an optical signal having been passed through the first and second reflective gratings into an electric signal and outputting the converted signal to said output power control circuit;
   a second optical detector configured for converting the first test light having been separated by said wavelength division multiplexing coupler into an electric signal and outputting the converted signal to said input power control circuit; and
   a third optical detector configured for converting the second test light having been separated by said wavelength division multiplexing coupler into an electric signal and outputting the converted signal to said input power control circuit.

4. The optical fiber amplifier of claim 1, wherein at least one of the first and second test lights comprises an amplified spontaneous emission.

5. The optical fiber amplifier of claim 1, wherein the signal wavelength band is an output signal of the optical fiber amplifier.

6. An optical fiber amplifier comprising:
   an optical amplifying section configured for amplifying an inputted optical signal;
   a sampling section including:
   a tap coupler configured for shunting and outputting part of an optical signal inputted from said optical sampling section to form said optical signal;
   a circulator which comprises first to third ports, the first port configured for inputting the shunted optical signal, the second port configured for outputting the shunted optical signal, the third port configured for outputting first and second test lights inputted from the second port;
   first and second reflective gratings configured for obtaining the first test light and the second test light from said shunted optical signal;
   optical detectors configured for detecting a first test light belonging to a short wavelength band from the shunted optical signal and a second test light belonging to a long wavelength band from the shunted optical signal;
   a wavelength division multiplexing coupler configured for separating the first and second test lights from each other;
   an input power control circuit configured for comparing powers of the first and second test lights with each other and outputting a control signal for controlling an input power of the optical signal inputted to said optical amplifying section according to the power differential of the first and second test lights;
   an output power control circuit configured for deriving an output power of said optical amplifying section from the power of the optical signal shunted at the sampling section and controlling the optical amplifying section so that the output power of the optical amplifying section is controlled to a desired value; and
   a variable attenuator for controlling the power of the optical signal inputted to the optical amplifying section according to the control signal.

7. The optical fiber amplifier of claim 6, wherein at least one of the first and second test lights comprises an amplified spontaneous emission.

8. The optical fiber amplifier according to claim 6, further comprising an auxiliary optical amplifying section configured for amplifying an inputted optical signal and outputting the signal to said variable attenuator.

9. The optical fiber amplifier according to claim 6, wherein said optical detectors comprise:
   a first optical detector configured for converting an optical signal having been passed through the first and second reflective gratings into an electric signal and outputting the converted signal to said output power control circuit;

a second optical detector configured for converting the first test light having been separated by said wavelength division multiplexing coupler into an electric signal and outputting the converted signal to said input power control circuit; and a third optical detector configured for converting the second test light having been separated by said wavelength division multiplexing coupler into an electric signal and outputting the converted signal to said input power control circuit.

10. The optical fiber amplifier of claim 6, wherein the optical amplifying section comprises an erbium doped fiber amplifier having an erbium doped fiber.

11. The optical fiber amplifier of claim 10, wherein the optical amplifying section comprises a pumping light source for pumping the erbium doped optical fiber.

12. The optical fiber amplifier of claim 11, wherein the optical amplifying section comprises a wavelength division multiplexing coupler configured for coupling pumping light outputted from the pumping light source to the erbium doped optical fiber.

13. The optical fiber amplifier of claim 6, wherein said desired value is invariant with said input power of the optical signal inputted to said optical amplifying section.

* * * * *